(12) United States Patent
Svinth

(10) Patent No.: US 8,650,247 B2
(45) Date of Patent: Feb. 11, 2014

(54) FOUR TIER ARCHITECTURE FOR IMPLEMENTING THIN CLIENTS

(75) Inventor: Michael Helligsø Svinth, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 12/754,072

(22) Filed: Apr. 5, 2010

(65) Prior Publication Data
US 2011/0246559 A1 Oct. 6, 2011

(51) Int. Cl.
*G06F 15/16* (2006.01)

(52) U.S. Cl.
USPC ............................ 709/203; 709/202; 709/225

(58) Field of Classification Search
USPC .......................................... 709/203, 202, 225
See application file for complete search history.

(56) References Cited

U.S. PATENT DOCUMENTS

| | | | |
|---|---|---|---|
| 6,377,973 B2 * | 4/2002 | Gideon .......................... | 709/203 |
| 6,738,027 B1 | 5/2004 | Doolittle et al. | |
| 6,874,025 B2 * | 3/2005 | Hoogenboom et al. ...... | 709/225 |
| 7,143,420 B2 | 11/2006 | Radhakrishnan | |
| 2005/0039173 A1 | 2/2005 | Tondreau et al. | |
| 2006/0167983 A1 * | 7/2006 | Webb ............................ | 709/203 |
| 2007/0050412 A1 * | 3/2007 | Robertson et al. ......... | 707/104.1 |
| 2007/0143339 A1 * | 6/2007 | Springett .................. | 707/103 R |
| 2007/0266042 A1 * | 11/2007 | Hsu et al. ..................... | 707/102 |

OTHER PUBLICATIONS

Juul, Thomas,"Silverlight N-tier Architecture", Retrieved at <<http://coreclr.files.wordpress.com/2009/10/silverlight_architecture.pdf>>, 2009, pp. 19.
Chartier, Robert, "Application Architecture: An N-tier Approach—Part 1-", Retrieved at <<http://www.15seconds.com/issue/011023.htm>>, 2010, pp. 7.
Shukla, Vishal, "ado.net Sync Services in N Tier Architecture", Retrieved at <<http://www.codeproject.com/KB/smart/sync_services.aspx>>, Oct. 7, 2008, pp. 4.
Grundy, et al., "An Architecture for Building Multi-device Thin-client Web User Interfaces", Retrieved at <<http://helios.mm.di.uoa.gr/~rouvas/ssi/caise2002/23480728.pdf>>, Proceedings of the 14th International Conference on Advanced Information Systems Engineering, May 27-31, 2002, pp. 728-932.
Helic, Denis, "Software Architecture VO/KU (706.016/706.017)", Retrieved at <<http://coronet.iicm.tugraz.at/sa/s5/sa_styles1.html>>, Jan. 9, 2008, pp. 13.

* cited by examiner

*Primary Examiner* — Nicholas Taylor
(74) *Attorney, Agent, or Firm* — Turk IP Law, LLC

(57) ABSTRACT

An application structure for enabling a logical client based 3-tier applications to support a thin client in a 4-tier architecture is provided. A logical client residing in a web server is extended with a proxy logical client residing in the thin client. The proxy logical client includes thin proxies for logical forms and controls enabling them to run on the thin client and facilitate seamless interaction of the thin client with applications within 3-tier architecture.

20 Claims, 9 Drawing Sheets

FOUR TIER ARCHITECTURE FOR IMPLEMENTING THIN CLIENTS

BACKGROUND

With the proliferation of enhanced communication networks and computing devices web services are becoming more popular for client/server communications. Web services can be located on servers within an enterprise or online (hosted offering) and accessed by clients for a wide variety of operations. Document sharing, search, analysis, reporting, data mining are just a few examples of web services. The increasing popularity of web services has brought about developments in thin clients like rich Internet applications with rich user interface (UI) in a browser or mobile client application.

A thin client a computer program, which depends heavily on another computer (or a server) to fulfill its traditional computational roles. This is in contrast with a traditional thick client, a computer program (or device) designed to perform these roles by itself. The server in the thin client set up may assume a variety of roles including, but not limited to, providing data persistence, information processing, communication facilitation, and comparable ones.

Thick client architectures typically include the client itself, an application server, and a database server managing processed data. Since thin client applications are recent, a large portion of web-based systems are designed using the 3-tiered thick client architecture. Thus, the shared roles between a thin client and its server (e.g. a web server) may present a challenge in integration of this relatively new development into legacy systems.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an application structure for enabling a logical client based 3-tier applications to support a thin client in 4-tier architecture. According to some embodiments, the logical client may be extended with a proxy logical client residing in the thin client. The proxy logical client may include thin proxies for logical forms and controls enabling them to run on the thin client and facilitate seamless interaction of the thin client with applications within 3-tier architecture.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
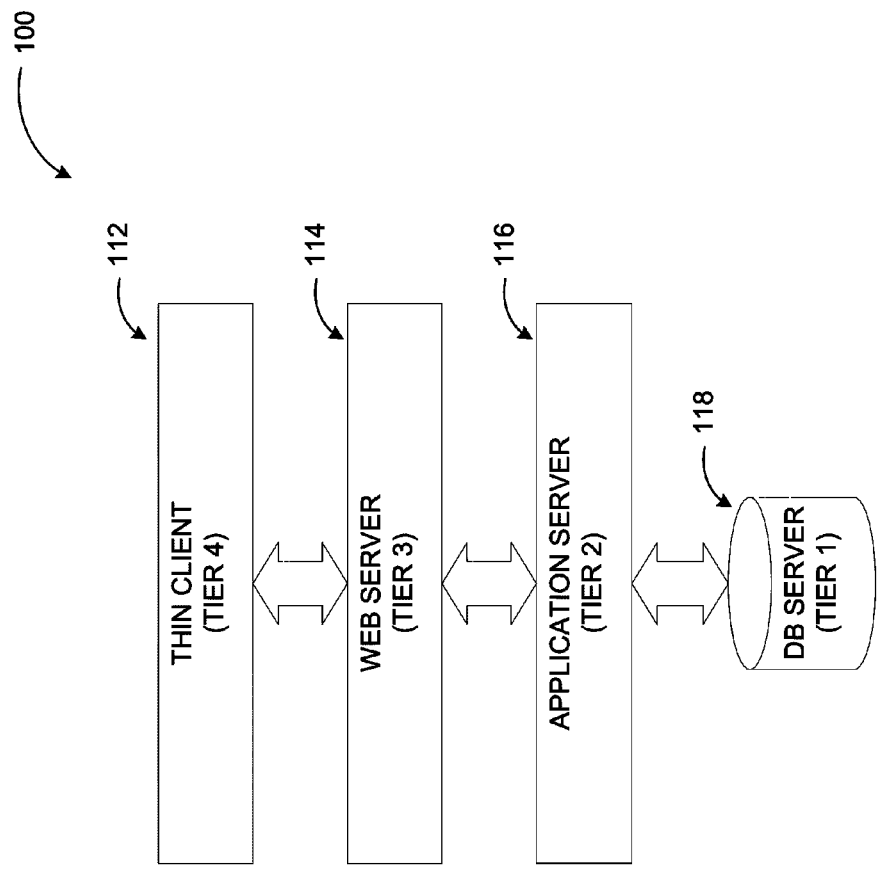
FIG. 1 is a diagram comparing 3-tier and 4-tier architectures for networked computing operations.
Figure 1:
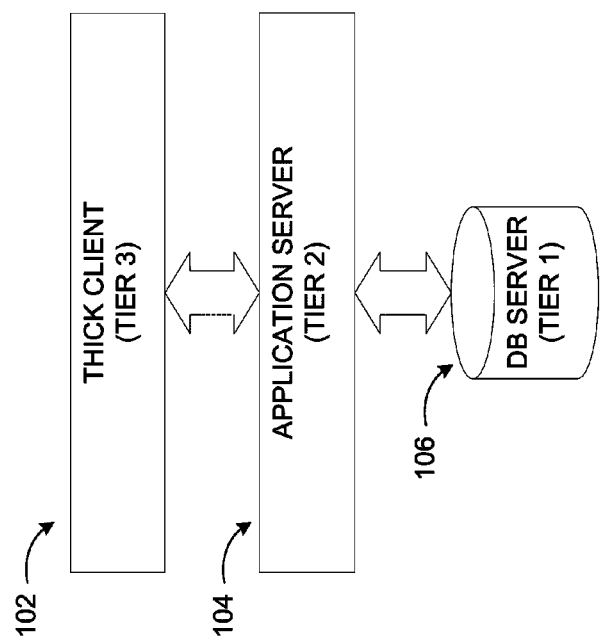

As briefly described above, a thick client 3-tier architecture, where the client is built around a logical client, may be extended to a 4-tier thin client architecture by extending the logical client with a proxy logical client running on the thin client (4th tier of the architecture) while the logical client is run on a web server (3rd tier of the architecture). Interactions with applications within a 3-tier structure may be facilitated through thin proxies of the proxy logical client for logical forms and controls. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing computer and network operations, which may include think clients. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a diagram comparing 3-tier and 4-tier architectures for networked computing operations. Thin clients are components of a broader computer infrastructure, where many clients share their computations with the same server. Thus, thin client infrastructures may be viewed as the representation of a computing service across several user-interfaces. An example of a thin client is a low-end computer terminal, which provides a graphical user interface to the end user with the remaining functionality such as the operating system being provided by the server.

Further examples of thin clients include web applications in browsing applications, mobile client applications and similar ones. Thin clients are typically not designed to run on a 3-tier architecture such as the .Net® framework by Microsoft Corp. of Redmond, Wash. Diagram 100 illustrates a 3-tier structure that includes thick client (tier 3) 102, application server (tier 2) 104, and database server (tier 1) 106. Thick client 102 has at least sporadic connection to application server 104 through a network, and is often characterized by the ability to perform many functions without that connection. Data to be processed by the coordinated operations of thick client 102 and application server 104 may be retrieved from or stored at a data store (e.g. a database, data cube, or any other data storage facility) through database server 106.

In contrast to thick client 102, thin client 112 is tier 4 of a 4-tier structure and generally does as little processing as possible relying on accessing the network each time input data needs to be processed or validated, for example. In the 4-tier architecture, thin client 112 accesses the resources of application server (tier 2) 116 through web server (tier 3) 114. Thus, thin client 112 and web server 114 perform the operations and tasks of a thick client in the 4-tier architecture. Data to be processed may still be retrieved from and/or stored at a data source through database server (tier 1) 118 by the application server 116. For example, thin client 112 may include a browsing application that enabled a user to utilize web-based word processing services. The word processing service itself may be executed and managed by the application server 116 and accessed through the interactions of thin client 112 and web server 114.

Figure 2:
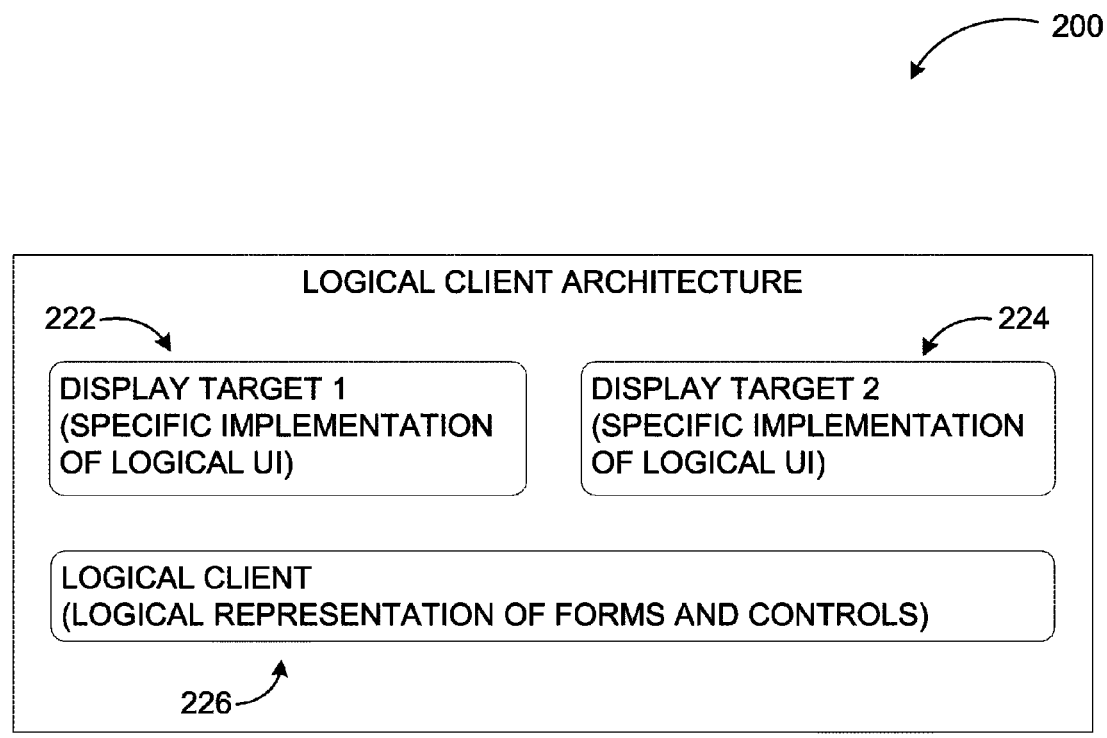
FIG. 2 illustrates a logical client structure that may reside within a web server.

FIG. 2 illustrates logical client architecture 200 that may reside within a web server. A system according to embodiments includes logical client architecture 200 residing in the web server of the $3^{rd}$ tier of the architecture. Logical client 226 of the architecture may be created during design-time and describe or model how data structures are transformed for use by the thin client. Logical client architecture 200 may be modeled based on data structures in a plurality of different applications and can be used to render a specific implementation of a user interface (UI) on a plurality of different display targets (e.g. display targets 222, 224). The applications may include business applications, such as ERP systems and CRM systems that store different types of data.

The different types of display targets 222, 224 may be configured to capture logical content generated by logical client 226 and render its logical content as a UI form. For example, if a display target is an Internet browser, the Internet browser may capture the content of logical client 226 and render the content as a web form. In some cases, the different types of display targets may display only a subset of the logical content that is included in the logical client. Logical client 226 may handle data binding and change propagation in addition to logical representation of forms and controls. Logical client 226 is typically independent of display targets 222 and 224

Figure 3:
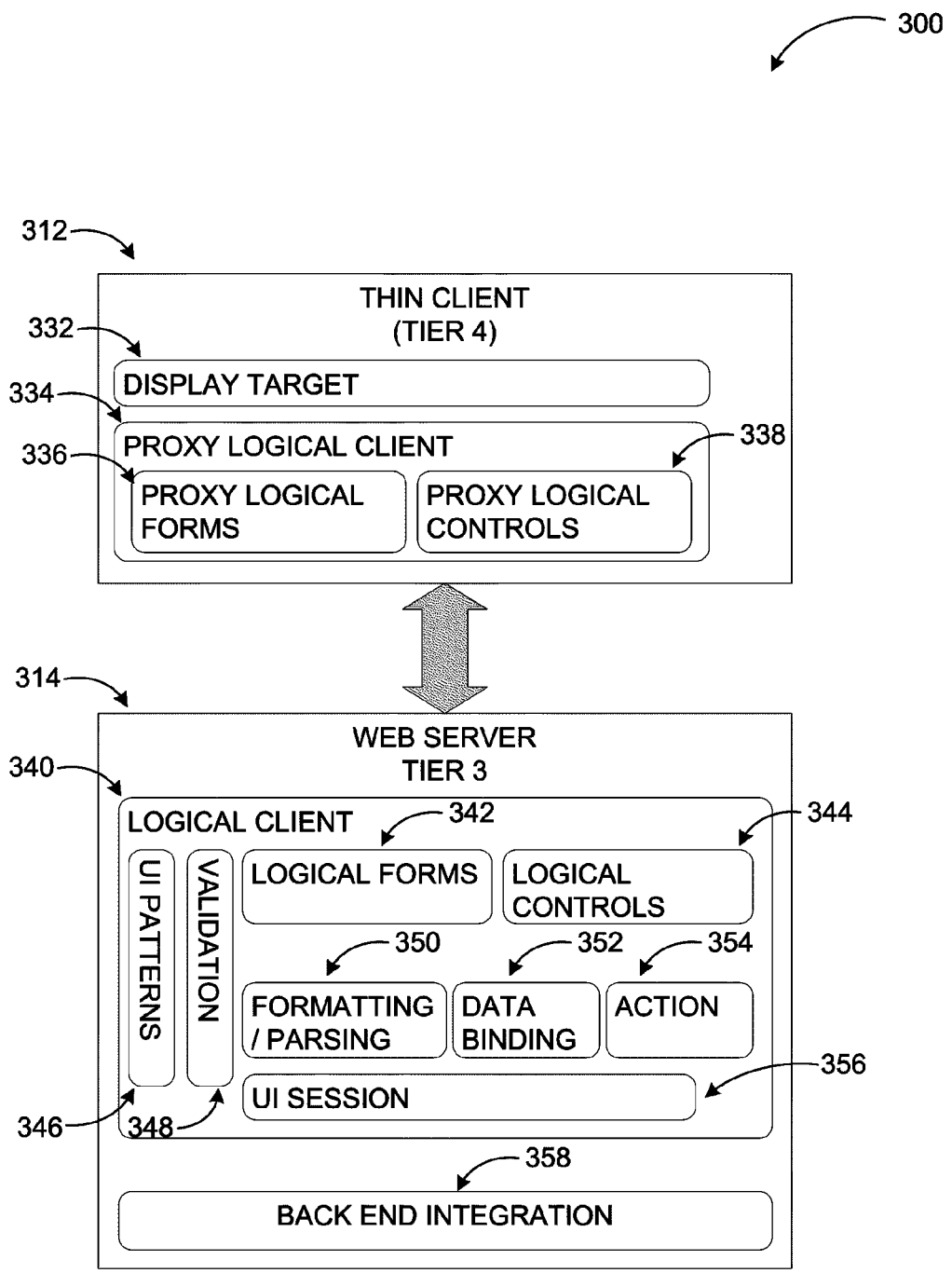
FIG. 3 illustrates a proxy logical client structure that may reside in a thin client as an extension of the logical client of a web server according to embodiments.

FIG. 3 illustrates in diagram 300 a proxy logical client structure that may reside in a thin client as an extension of the logical client of a web server according to embodiments. Thin client 312 according to embodiments includes a proxy logical client 334, which allows the logical client on tier 3 (logical client 226 of FIG. 2) to be extended (or proxied) onto the thin client 312. The logical client runs in web server tier, while the corresponding proxy logical client runs on the thin client. Thus, the logical client itself becomes two tiered for practical purposes.

Proxy logical client 334 may include proxy logical forms 336 and proxy logical controls 338. The proxy controls/forms (336, 338) contain the property data—state—of the forms/controls, but not their behavior. Behavior of a control may be executed by the logical client 340 on web server 314 of tier 3. Other artifacts of the logical client 340 like data binding etc. may also be available and executed on tier 3. Proxy logical client 334 may interact with display target 332 of the thin client as described previously.

Logical client 340 may include a UI session module 356. To render a UI form, one of the display targets may initiate a session provided by the UI session module 356. The session may validate (validation 348) a user's credentials. A logical UI representation may be built that includes content pertaining to logical forms 342, controls 344, actions 354, and data binders (352). The content of the logical UI representation is independent of the source of data and independent of the display target on which it will be rendered. Content of the logical UI representation (UI patterns 346) may be exposed to at least one display target (e.g. display target 332) for rendering of a UI form. Other actions performed by the logical client 340 may include formatting and/or parsing 350 and back end integration 358 of services with an application server on the $2^{nd}$ tier.

Figure 4:
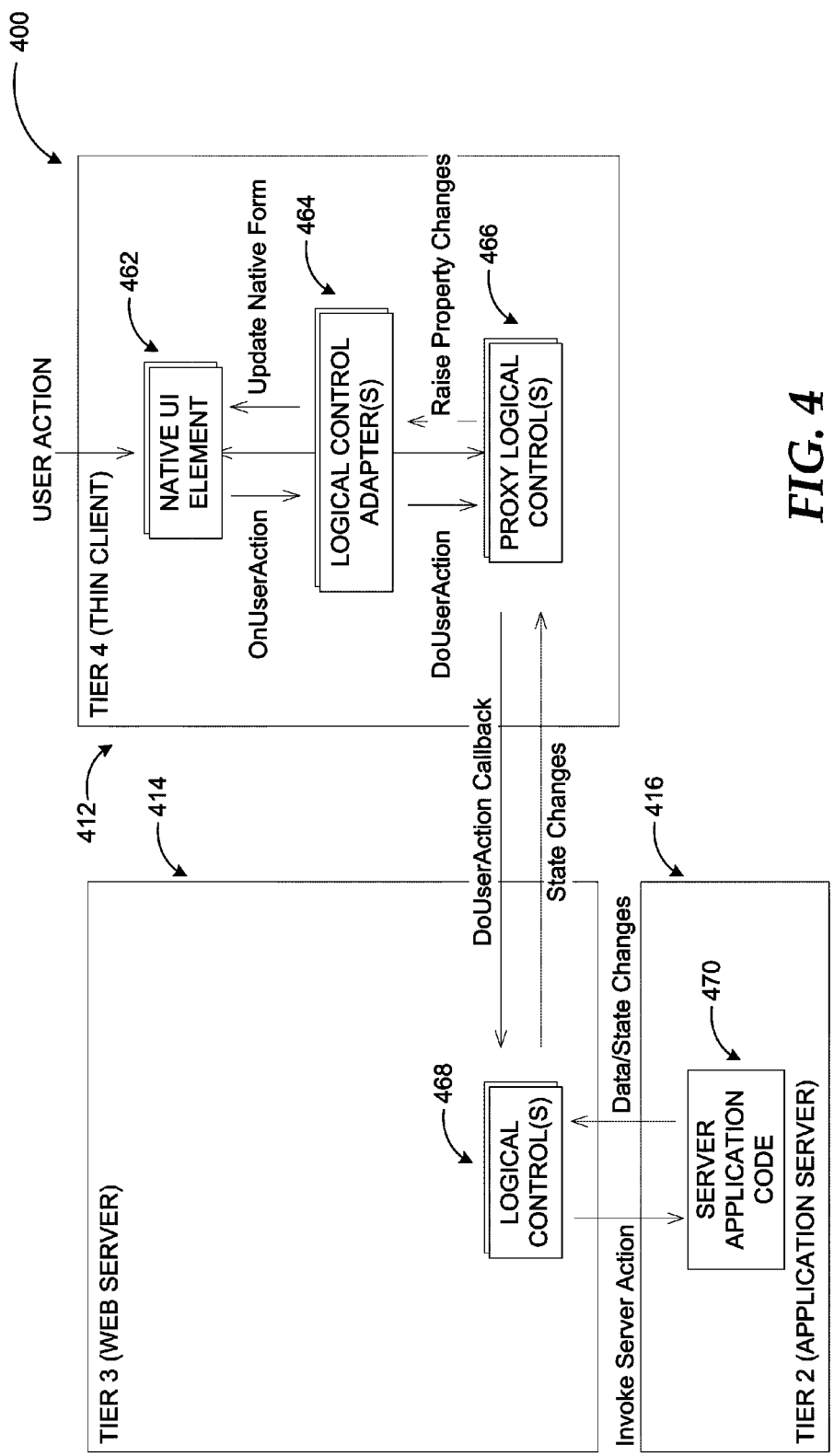
FIG. 4 illustrates interactions between example components of a system according to embodiments.

FIG. 4 illustrates interactions between example components of a system according to embodiments. While many different interactions may take place between the proxy logical client of a thin client and logical client of a web server to provide access to remote services through a 4-tier thin client architecture, an example scenario is shown in diagram 400 for illustration purposes.

According to an example scenario, native user interface (UI) elements 462 (e.g. a text box, a button, etc.) of the thin client (on tier 4) 412 may receive a user action and instruct proxy logical controls 466 through logical control adapters 464 of the thin client 412. For executing a behavior of the logical client the proxy logical client may make a callback to the tier 3 (414) logical client through proxy logical controls 466. Logical controls 468 of the logical client may then invoke server action with server application code 470 at the application server (tier 2) 416 and receive data/state changes in response. The state changes are forwarded from logical controls 468 to proxy logical controls 466 on thin client upon callback completion. On the proxy logical client the property/data changes happening during this callback may then be applied updating the native form on the native UI elements 462, which ensures that the proxy reflects the changed state of the real logical client.

Figure 5:
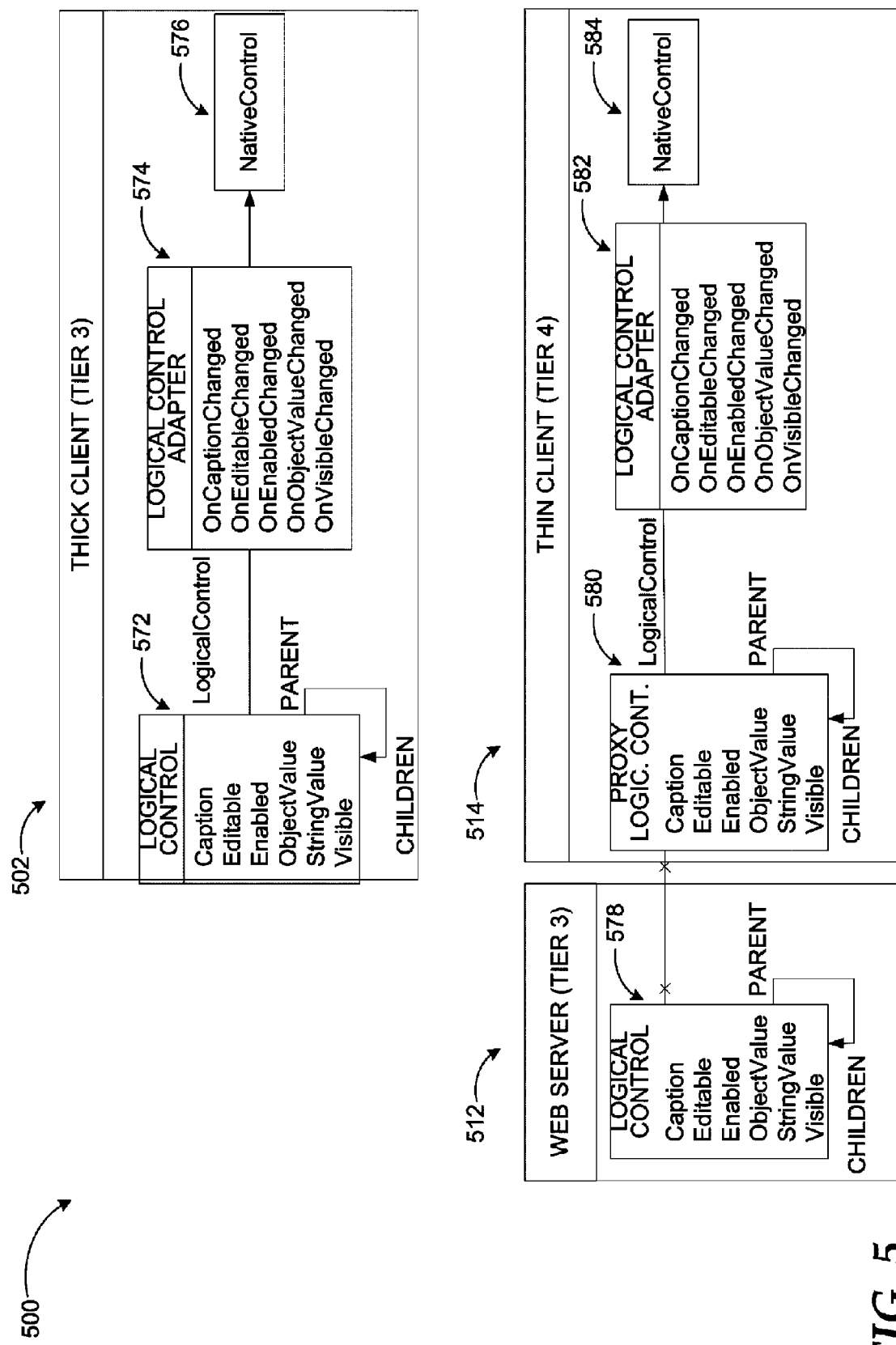
FIG. 5 illustrates an example programming model for a thick client and a corresponding example model for a thin client according to one embodiment.

FIG. 5 illustrates an example programming model for a thick client and a corresponding example model for a thin client according to one embodiment. As shown in diagram 500, a proxy logical client based 4-tier thin client architecture employs a programming model for the code on the thin client 502 that is similar to the programming model of the thick client 514. In the thick logical client the model includes logical controls 572, which are adapted to native controls 576 through control logical control adapters 574.

The programming model on the thin client 514 is equivalent. On the thin client, a developer may also create a logical control adapter 582, which adapts the thin proxy logical control 580 to a native control 584 on the thin client 514. The fact that the logical control adapter 582 is working against a proxy may be transparent to the developer and a display target developer may be prevented from direct access to the real logical control 578 on the web server 512.

Figure 6:
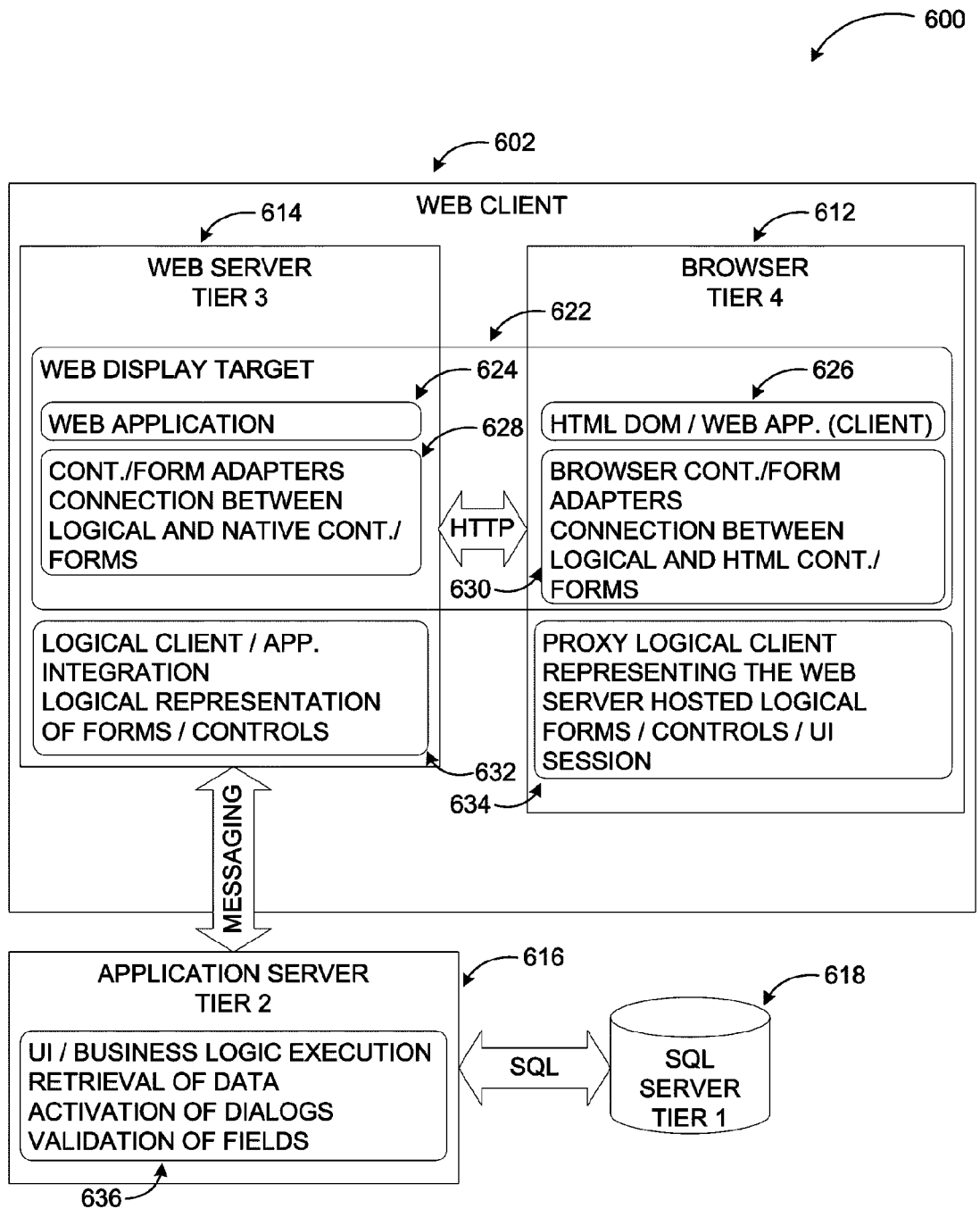
FIG. 6 illustrates an example implementation platform for a 4-tiered thin client architecture.

FIG. 6 illustrates an example implementation platform for 4-tiered thin client architecture. Because a proxy logical client does not require a full framework or operating system to function, it may be implemented and executed on a thin client such as browser 612 as part of a rich web application according to an example scenario.

In the example architecture of diagram 600, browser 612 and web server 614 are part of a web service client. The example web service may enable users to store, share, edit, retrieve, and view various documents that are traditionally processed by distinct applications installed on individual computing devices.

Data and state exchanges between web application 624 on web server 614 and corresponding hypertext markup language (HTML) document object model (DOM)/client web application 626 may be facilitated by control/form adapters 628, which provide the connections between logical and native controls/forms, and browser control/form adapters 630, which provide connection between logical and HTML controls/forms. The control/form adapters 628 and browser control/form adapters 630 communicate, for example, using hypertext transport protocol (HTTP). Web display target 622 may provide rendering of content from logical client 632 and proxy logical client 634 through browser 612.

Logical client 632 handles logical representation of forms and controls with an application specific client integration layer exchanging messages with application server 616 (web application), which executes UI and business logic, retrieves data from SQL database server 618, activates dialogs, and validates fields. Proxy logical client 634 represents web server hosted logical forms, controls, UI, and session(s) at the thin client (browser) 612.

The example systems in FIG. 2 through 6 have been described with specific servers, clients, software modules, components, and interactions. Embodiments are not limited to systems according to these example configurations. A four tier architecture for thin clients may be implemented in configurations employing fewer or additional components and performing other tasks. Furthermore, specific protocols and/or interfaces may be implemented in a similar manner using the principles described herein.

Figure 7:
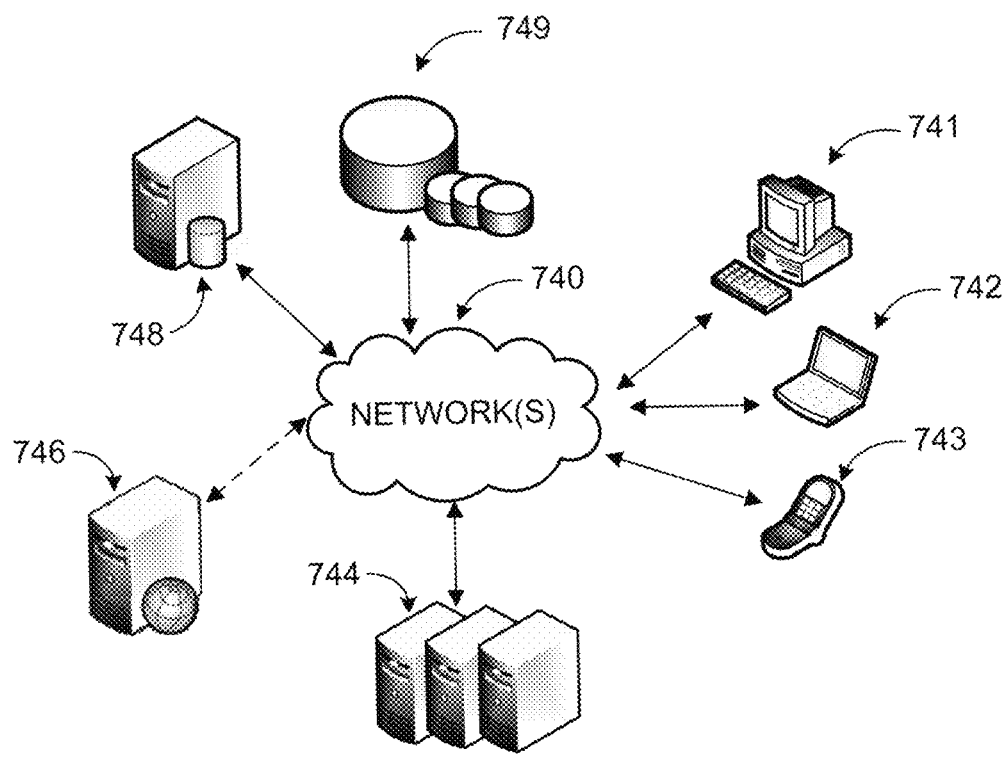
FIG. 7 is a networked environment, where a system according to embodiments may be implemented.

FIG. 7 is an example networked environment, where embodiments may be implemented. A platform providing thin client applications in 4-tiered architecture may be implemented via software executed over one or more servers 744 or a single server (e.g. web server) 746 such as a hosted service. The platform may communicate with thin client applications on individual computing devices such as a smart phone 743, a laptop computer 742, or desktop computer 741 ('client devices') through network(s) 740.

As discussed above, client applications executed on any of the client devices 741-743 may execute a thin client that in conjunction with logical client running on a web server (e.g. on the servers 744 or on individual server 746) enables access to applications executed on remote server(s) (e.g. one of servers 744) as discussed previously. The remote application server may retrieve or store relevant data from/to data store(s) 749 directly or through database server 748.

Network(s) 740 may comprise any topology of servers, clients, Internet service providers, and communication media. A system according to embodiments may have a static or dynamic topology. Network(s) 740 may include secure networks such as an enterprise network, an unsecure network such as a wireless open network, or the Internet. Network(s) 740 may also coordinate communication over other networks such as Public Switched Telephone Network (PSTN) or cellular networks. Furthermore, network(s) 740 may include short range wireless networks such as Bluetooth or similar ones. Network(s) 740 provide communication between the nodes described herein. By way of example, and not limitation, network(s) 740 may include wireless media such as acoustic, RF, infrared and other wireless media.

Many other configurations of computing devices, applications, data sources, and data distribution systems may be employed to implement a four tiered architecture for thin clients. Furthermore, the networked environments discussed in FIG. 7 are for illustration purposes only. Embodiments are not limited to the example applications, modules, or processes.

Figure 8:
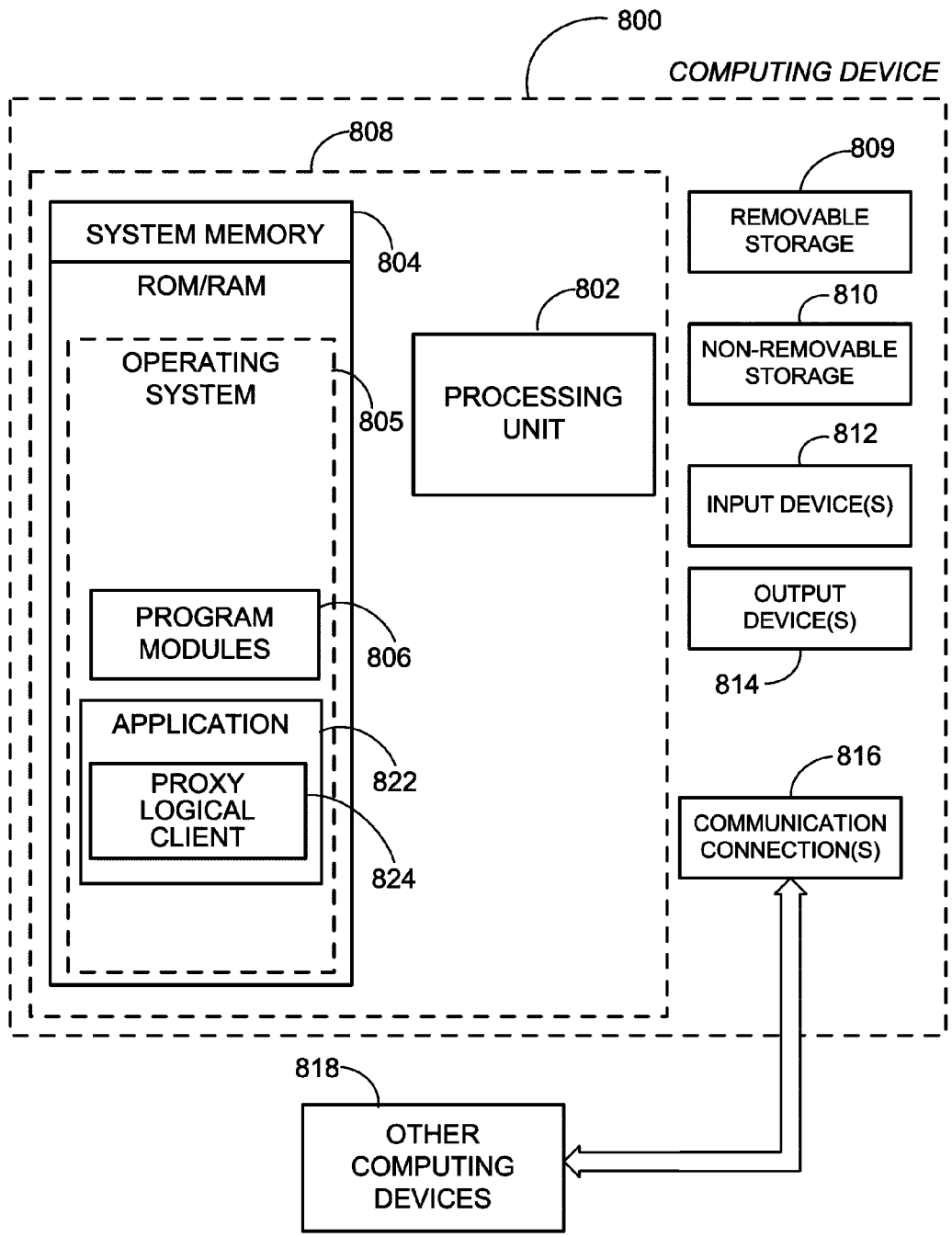
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a client device executing a thing client capable of interacting with a web server through a proxy logical client according to embodiments and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, thin client application 822 and proxy logical client 826.

Application 822 may be any thin client application interacting with a remote application or a hosted service. Proxy logical client 826 may enable forwarding of user actions to a logical client on a web server through a callback and update the state of the thin client upon completion of the callback. This basic configuration is illustrated in FIG. 8 by those components within dashed line 808.

Computing device 800 may have additional features or functionality. For example, the computing device 800 may also include additional data storage devices (removable and/ or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wired or wireless network in a distributed computing environment, a satellite link, a cellular link, a short range network, and comparable mechanisms. Other devices 818 may include computer device(s) that execute communication applications, other web servers, and comparable devices. Communication connection(s) 816 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
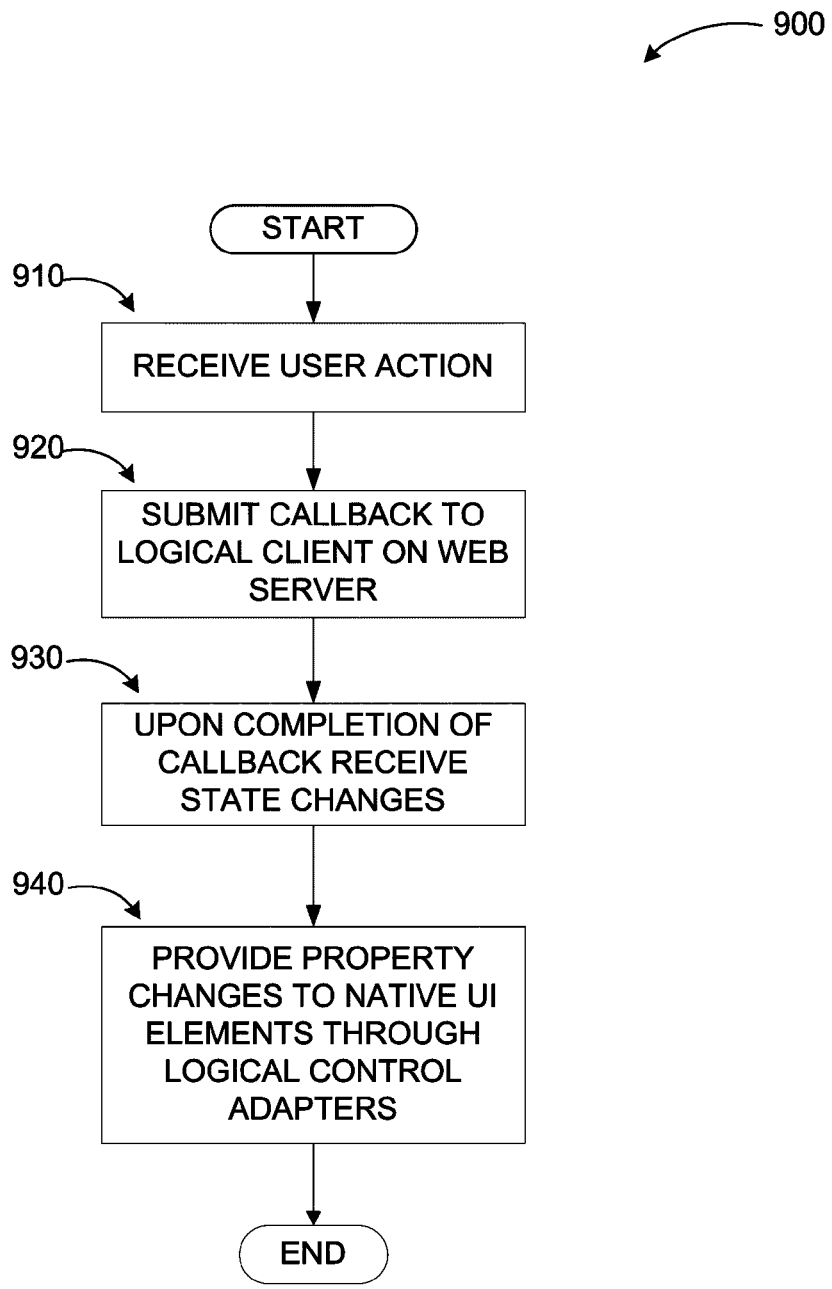
FIG. 9 illustrates a logic flow diagram for a process of implementing a 4-tiered architecture for thin clients according to embodiments.

FIG. 9 illustrates a logic flow diagram for a process 900 of extending a 3-tier architecture to a 4-tier architecture for thin clients according to embodiments. Process 900 may be implemented as part of a thin client application executed on a client device.

Process 900 begins with operation 910, where a user action may be received through a UI of the thin client. The requested action may be provided through logical control adapters to a proxy logical client executed on the thin client, which submits a callback to a corresponding logical client residing on a web server at operation 920. The logical client on the web server may interact with an underlying application server performing the requested action by retrieving data from a data source through the application server and submit state changes to the proxy server upon completion of the callback.

At operation 930, the proxy logical client receives the state changes and raises property changes to the native UI elements of the thin client through logical control adapters updating the native form at operation 940. That way, the proxy logical client reflects the changed state at the real logical client on the web server.

The operations included in process 900 are for illustration purposes. A 4-tier architecture for thin clients may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for executing a thin client in a four tier architecture, the method comprising:
receiving a user action at the thin client, the thin client including a web browser;
forwarding the user action to a proxy logical client executed on the thin client to instruct proxy logical controls through a logical control adapter, the proxy logical controls including a property, data, and a state of the proxy logical controls;
submitting a callback associated with the user action from the proxy logical client to a logical client external to the thin client through the proxy logical controls;
receiving state changes associated with the performed user action through logical controls at the logical client upon completion of the callback, the logical controls adapted to native controls through logical control adapters;
updating a state of the thin client by raising property changes from the proxy logical client;
performing at least one of: a formatting action and a parsing action along with a back end integration of services with an application server at the proxy logical client; and
using the proxy logical client to limit displaying of a logical content at the thin client to a subset included in the logical client.

2. The method of claim 1, further comprising:
receiving the user action through a native user interface element; and
updating a native form at the native user interface element through the logical control adapter.

3. The method of claim 1, wherein the proxy logical client includes the proxy logical controls and proxy logical forms.

4. The method of claim 3, wherein the callback is submitted to the logical client through the proxy logical controls of the proxy logical client.

5. The method of claim 3, wherein the proxy logical controls and proxy logical forms include properties reflecting a state of the proxy logical client.

6. The method of claim 1, wherein the callback causes execution of a behavior at the logical client.

7. The method of claim 1, wherein the thin client includes at least one display target adapted to capture the logical content generated by the logical client and render the logical content as a user interface (UI) form.

8. The method of claim 7, wherein the proxy logical client is transparent to a display target developer.

9. The method of claim 1, further comprising:
managing a user interface session for the thin client by the proxy logical client.

10. A computing device for facilitating remote application access through a thin client, the computing device comprising:
a memory;
a processor coupled to the memory, the processor executing the thin client application in conjunction with instructions stored in the memory, wherein the thin client includes:
a display target; and
a proxy logical client, the proxy logical client configured to:
receive a user action from a native user interface element;
instruct proxy logical controls through logical control adapters of the thin client;
submit a callback associated with the user action to a logical client external to the thin client through the proxy logical controls;
invoke a server action with a server application code at the logical client through logical controls of the logical client;
receive state changes from the logical controls of the logical client to the proxy logical controls of the proxy logical client upon completion of the callback associated with the performed user action by the logical client;
update at least one of a state and a property managed by the thin client by raising property changes to the native user interface element;
manage logical representation of forms and controls with an application specific client integration layer exchanging messages with an application server; and
employ a user interface session module at the logical client to initiate a user interface session and validate a user credential of the user interface session.

11. The computing device of claim 10, wherein the proxy logical client updates is further configured to update a native form at the native user interface elements.

12. The computing device of claim 10, wherein the proxy logical client includes representations of web server hosted controls and forms associated with remotely executed business logic.

13. The computing device of claim 10, wherein the thin client is configured to access the remote application executed on the application server through the logical client executed on a web server.

14. The computing device of claim 11, wherein data associated with the user action is retrieved from a data source accessed by the remote application.

15. The computing device of claim 10, wherein the proxy logical client further manages content for a thin client user interface and the user interface session for the display target, the display target rendering the content.

16. The computing device of claim 10, wherein a programming model for the thin client is equivalent to a programming model for a thick client with the proxy logical client being transparent to a thin client programming developer.

17. A computer-readable memory device with instructions stored thereon for facilitating remote application access through a thin client in a four tiered architecture, the instructions comprising:
receiving a callback at a logical client executed on a web server from a proxy logical client executed on the thin client in a transparent manner to a developer of the thin client;
invoking a server action with a server application code at the logical client through logical controls of the logical client to execute a behavior of a proxy logical client control in response to the callback, the logical controls adapted to native controls through logical control adapters configured to provide connections between the logical controls and the native controls through hypertext transport protocol;
causing execution of a user interface, retrieval of remotely stored data, and execution of remote business logic by the server action;
receiving at least one of a data change and a state change at the logical controls of the logical client;
providing the state change from the logical controls of the logical client to the proxy logical controls of the proxy logical client to enable the thin client to update a state of the thin client reflecting a state of the logical client;
performing at least one of: a formatting action and a parsing action along with a back end integration of services with an application server at the logical client;
managing logical representation of forms and controls with an application specific client integration layer exchanging messages with an application server;
using the proxy logical client to limit displaying of a logical content at the thin client to a subset included in the logical client; and
employing a user interface session module at the logical client to initiate a user interface session and validate a user credential of the user interface session.

18. The computer-readable memory device of claim 17, wherein the logical client is further configured to process data bindings and to expose a logical user interface representation to at least one display target for rendering.

19. The computer-readable memory device of claim 17, wherein the logical client is created at design time to model a transformation of data structures for use by the thin client.

20. The computer-readable memory device of claim 19, wherein the logical client is modeled based on data structures in a plurality of remotely executed applications.

* * * * *